United States Patent
Gupta et al.

(10) Patent No.: US 11,425,007 B2
(45) Date of Patent: Aug. 23, 2022

(54) LABEL-BASED RULES FOR SQUELCHING VISIBLE TRAFFIC IN A SEGMENTED NETWORK ENVIRONMENT

(71) Applicant: Illumio, Inc., Sunnyvale, CA (US)

(72) Inventors: Mukesh Gupta, Fremont, CA (US); Joy Anne Scott, Los Altos, CA (US); Juraj George Fandli, Campbell, CA (US); Joel E. Vanderkwaak, Mountain View, CA (US); Ramnath Duggirala, Sunnyvale, CA (US)

(73) Assignee: Illumio, Inc., Sunnyvale, CA (US)

( * ) Notice: Subject to any disclaimer, the term of this patent is extended or adjusted under 35 U.S.C. 154(b) by 0 days.

(21) Appl. No.: 16/748,735

(22) Filed: Jan. 21, 2020

(65) Prior Publication Data
US 2021/0226865 A1    Jul. 22, 2021

(51) Int. Cl.
*H04L 43/045* (2022.01)
*H04L 43/062* (2022.01)
*H04L 43/026* (2022.01)

(52) U.S. Cl.
CPC .......... *H04L 43/045* (2013.01); *H04L 43/026* (2013.01); *H04L 43/062* (2013.01)

(58) Field of Classification Search
CPC .... H04L 43/045; H04L 43/062; H04L 43/026
See application file for complete search history.

(56) References Cited

U.S. PATENT DOCUMENTS

| | | | |
|---|---|---|---|
| 7,304,945 B1* | 12/2007 | Vishnu | H04L 12/5602 370/229 |
| 7,680,952 B1* | 3/2010 | Pan | H04L 43/0811 709/239 |
| 8,745,691 B1* | 6/2014 | Vassilev | H04L 63/0227 726/1 |
| 9,560,081 B1* | 1/2017 | Woolward | H04L 63/0263 |
| 10,476,745 B1* | 11/2019 | McCormick | H04L 41/0806 |
| 10,992,585 B1* | 4/2021 | Gilman | H04L 47/2441 |
| 2006/0106847 A1* | 5/2006 | Eckardt, III | G06F 16/3323 |
| 2009/0083303 A1* | 3/2009 | Singh | H04L 41/5067 |
| 2010/0247094 A1* | 9/2010 | Young | H04L 45/24 398/25 |
| 2018/0234459 A1* | 8/2018 | Kung | H04L 63/0263 |
| 2018/0359312 A1* | 12/2018 | Dabell | H04L 67/1023 |
| 2019/0089773 A1* | 3/2019 | Dias | G06F 9/5077 |
| 2019/0123905 A1* | 4/2019 | Kirner | H04L 63/20 |
| 2019/0207860 A1* | 7/2019 | York | G06F 9/5077 |
| 2019/0222610 A1* | 7/2019 | Kirner | H04L 63/20 |
| 2019/0258525 A1* | 8/2019 | Glenn | H04L 63/1433 |

(Continued)

*Primary Examiner* — Ninos Donabed
(74) *Attorney, Agent, or Firm* — Fenwick & West LLP (57) ABSTRACT

In a segmented network environment, a traffic flow graph provides visibility into the connections between workloads or groups of workloads under management of a segmentation policy. Squelching rules may be applied to hide traffic in the traffic flow graph that meets specified criteria. The squelching rules may be label-based rules that enable configuration of squelching rules that apply to group of workloads and enable configurations to be rapidly updated as workloads or added or dropped from the network or as their configurations change. Additionally, squelching rules may be applied based on characteristics of the traffic data or based on an identity of an administrator viewing the traffic flow graph.

15 Claims, 6 Drawing Sheets

(56) References Cited

U.S. PATENT DOCUMENTS

| | | | |
|---|---|---|---|
| 2019/0258804 A1* | 8/2019 | Glenn | G06F 9/5077 |
| 2019/0266528 A1* | 8/2019 | Cheng | G06Q 10/0635 |
| 2019/0372850 A1* | 12/2019 | Fandli | H04L 63/0263 |
| 2020/0067801 A1* | 2/2020 | McCormick | H04L 43/062 |
| 2020/0106741 A1* | 4/2020 | Fandli | H04L 43/045 |
| 2020/0228486 A1* | 7/2020 | Park | H04L 63/101 |
| 2020/0280586 A1* | 9/2020 | Gupta | H04L 9/32 |
| 2021/0144159 A1* | 5/2021 | Sanghvi | H04L 63/1425 |

* cited by examiner

LABEL-BASED RULES FOR SQUELCHING VISIBLE TRAFFIC IN A SEGMENTED NETWORK ENVIRONMENT

BACKGROUND

Technical Field

This application relates to monitoring traffic flows in a segmented network environment.

Description of Related Art

A segmentation policy comprises a set of rules that control which workloads may communicate on a network and may place restrictions on how such workloads may communicate. The segmentation policy may be enforced in a distributed manner in which distributed firewalls on enforcement modules of individual hosts or network devices act to filter traffic to one or more workloads based on the segmentation policy. In a segmented network environment, it is desirable to monitor traffic flows between workloads and present a customized visualization of the monitored traffic flows in order to track performance of the segmentation policy and enable updating of the segmentation policy to improve security.

SUMMARY

A system, non-transitory computer-readable storage medium, and method is provided for generating a traffic flow graph representing traffic in a segmented network environment. A segmentation server receives from a plurality of enforcement modules, traffic flow data representing traffic to and from workloads managed by the enforcement modules. The segmentation server processes the traffic flow data to apply a squelching rule that hides at least one connection in the traffic flow graph to generate refined traffic flow data. The segmentation server generates the traffic flow graph comprising a visual representation of the refined traffic flow data, and provides the traffic flow graph to an administrator client for display.

In an embodiment, the traffic flow data is processed by identifying a first label set representing a first group of workloads and a second label set representing a second group of workloads associated with the squelching rule, and applying the squelching rule only to the traffic between the first group of workloads and the second group of workloads.

In another embodiment, the traffic flow data is processed by hiding traffic flow data meeting squelching criteria specified in the squelching rule that identifies a type of traffic for squelching.

In another embodiment, the traffic flow data is processed by identifying an administrator logged into the segmentation server, identifying a set of squelching rules associated with the administrator, and applying the set of squelching rules associated with the administrator to squelch traffic flow data.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

In a segmented network environment, a traffic flow graph provides visibility into the connections between workloads or groups of workloads under management of a segmentation policy. By viewing an interacting with the traffic flow graph, an administrator can more efficiently generate or update the segmentation policy according to desired security preferences. In order to more efficiently understand traffic flows, squelching rules may be applied to hide traffic in the traffic flow graph that meets specified criteria. The squelching rules may be label-based rules that enable configuration of squelching rules that apply to group of workloads and enable configurations to be rapidly updated as workloads or added or dropped from the network or as their configurations change.

Figure 1:
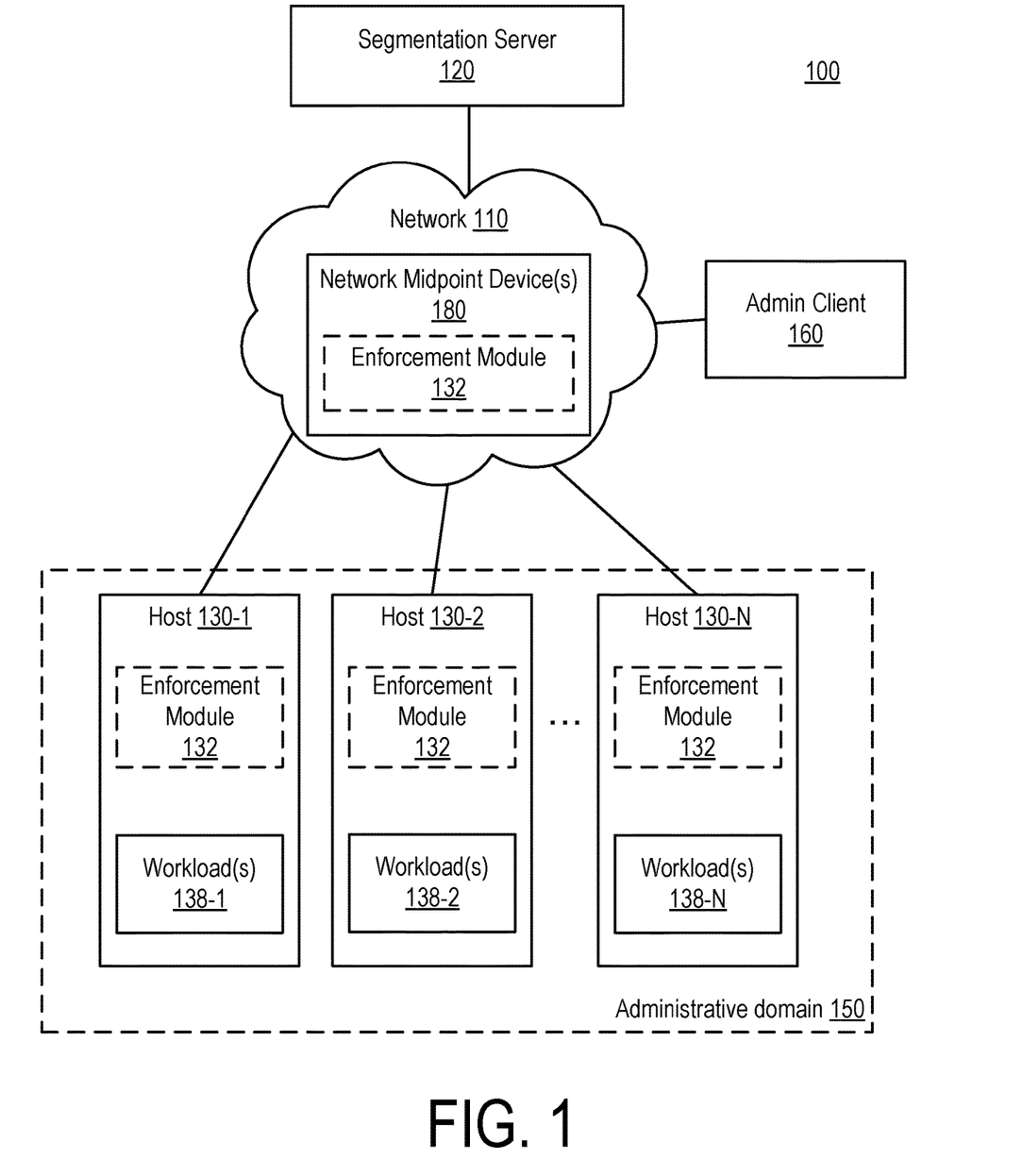
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110 including one or more network midpoint devices 180, an administrative client 160, and an administrative domain 150 that includes a plurality of hosts 130 (e.g., hosts 130-1, 130-2, . . . , 130-N). The administrative domain 150 can correspond to a set of devices controlled by an enterprise such as, for example, a service provider, a corporation, a university, or a government agency.

The hosts 130 may each comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, an operating system instance, or other sub-component thereof executing on the host 130. In some instances, a host 130 may operate only a single workload 138. In other instances, a host 130 may operate multiple workloads 138 (e.g., multiple containers) that may be independently addressable and may execute different applications or otherwise perform different independent computing functions. In some embodiments, multiple workloads 138 may operate collectively to execute an application. The workloads 138 on the hosts 130 may communicate with other workloads 138 on different hosts 130 within the administrative domain 150 to perform various tasks.

The network 110 represents the communication pathways between the segmentation server 120, the administrative client 160, and the hosts 130. In one embodiment, the network 110 uses standard communications technologies and/or protocols and can include the Internet. In another embodiment, the entities on the network 110 can use custom and/or dedicated data communications technologies. The network 110 includes one or more network midpoint devices 180 that facilitate communications over the network 110. The network midpoint devices 180 may include, for example, routers, switches, access points, firewall devices, or other devices that control communications between the workloads 138 over the network 110.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view a segmentation policy as described below. The interface may furthermore enable the administrator to obtain various information about the hosts 130 and workloads 138 on the network 120 and view or interact with visualizations of traffic flows between workloads 138 as described below.

The segmentation server 120 is a computer (or set of computers) that obtains and stores information about the hosts 130 on the network 110, the network midpoint devices 180, and the workloads 138 executing on the hosts 130. The segmentation server 120 manages a segmentation policy for the administrative domain 150 that regulates communications between workloads 138 within the administrative domain 150. In an embodiment, the segmentation policy is set forth using permissive rules that specify connections that are permitted. The segmentation policy is enforced by blocking connections that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on a host 130-1 is allowed to provide a particular service to a workload 138-2 operating on a host 130-2. Absent other rules, the workload 138-1 will thus be blocked from providing the service to a workload 138-N operating on a host 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the segmentation server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may retain a repository storing information about the hosts 130 and the workloads 138 managed by the segmentation server 120. For example, the segmentation server 120 may store workload identifiers that identify the workloads 138, and membership information indicating one or more groups of workloads 138 to which each workload 138 belong (e.g., as defined by the respective label sets for the workloads 138).

Table 2 illustrates an example of information stored by the segmentation server 120. Here, the workload IDs represent the workload identifiers for the workloads 138. The memberships represent groups to which one or more workloads 138 belongs. Each group may correspond to a unique label set involving one or more dimensions.

TABLE 2

Example of a Repository Table

| Workload ID | Memberships |
|---|---|
| ID1 | A, C, D |
| ID2 | B, C |
|  | D |
| . | . |
| . | . |
| . | . |
| IDn | B, D, E, F |

Instead of enforcing the segmentation policy at a centralized device, the segmentation policy is instead enforced in a distributed manner by at least a subset of the hosts 130 and/or the network midpoint devices 180. To enable enforcement of the segmentation policy, the segmentation server 120 generates a set of management instructions and distributes the management instructions to enforcement modules 132 that may be executed on the hosts 130 or on the network midpoint devices 180. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different enforcement modules 132 so that each enforcement module 132 gets only the management instructions relevant to its operation. Here, the segmentation server 120 may determine which rules are relevant to a given enforcement module 132 and distribute the relevant rules to that enforcement module 132. A rule may be deemed relevant to an enforcement module 132 on a particular host 130 if that host 130 executes one or more workloads 138 that belongs to a group (defined by one or more label sets) referenced by the rule and the enforcement module 132 on the host 130 is configured to enforce that particular rule. A rule may be deemed relevant to an enforcement module 132 on a particular network midpoint device 180 if that network midpoint device 180 is upstream from a host 130 executing one or more workloads 138 that belongs to a group (defined by one or more label sets) referenced by the rule and the enforcement module 132 on the network midpoint device 180 is configured to enforce that particular rule. The segmentation server 120 may furthermore determine which membership information is relevant to each enforcement module 132 and distribute the relevant membership information to each respective enforcement module 132. Here, membership information may be relevant to a particular enforcement module 132 if it defines membership of a group referenced by a rule deemed relevant to the particular enforcement module 132.

In an embodiment, the enforcement modules 132 may monitor traffic that is either blocked or allowed to pass through to or from a workload 138. The enforcement modules 132 may log the traffic and/or report the traffic to the segmentation server 120. The segmentation server 120 may receive the reported traffic from the enforcement modules 132 and may generate a visual representation of the connections being allowed and connections being blocked.

Figure 2:
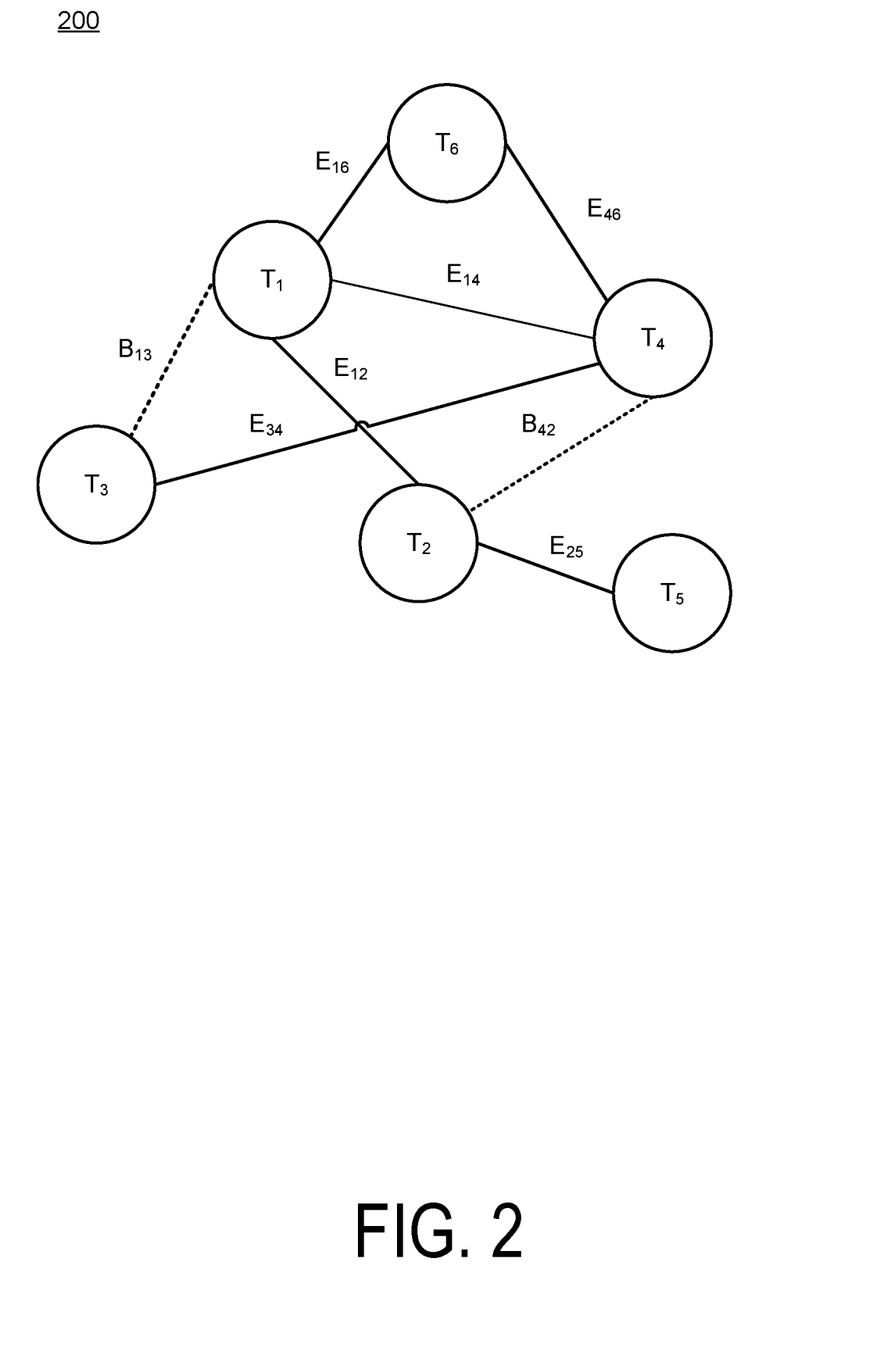
FIG. 2 illustrates an example embodiment of a traffic flow graph that provides a visualization of traffic flow data in a segmented network environment.

FIG. 2 illustrates an example embodiment of a traffic flow graph 200 for visualizing the traffic flow data. Here, the traffic flow graph 200 illustrates each workload 138 (or group of workloads 138) as a node T and illustrates connections between workloads 138 (or groups of workloads 138) as a line E connecting the respective nodes T The traffic flow graph may additionally or alternatively include lines B representing attempted connections between nodes T that are blocked by the enforcement modules as lines in the traffic flow graph. In other embodiments, additional lines may be illustrated to indicate connections for which no rule allowing the connection exists in the segmentation policy, but that are presently allowed because the enforcement module is configured in a monitoring only mode in which it does not enforce the segmentation policy. Lines representing permitted connections and blocked connections may be visually distinguished in the traffic flow graph based on a visual feature such as color, line weight, line style, reference indicator, etc.

The traffic flow graph 200 may be viewed at different granularity levels. For example, at an application level view, workloads 138 belonging to the same application are grouped as a single node T. Connections between a pair of nodes T are represented as lines E between the nodes if any workloads 138 within the respective group are connected (even if no traffic is observed between other workloads 138 in the group). At a workload level view, nodes T may instead represent individual workloads 138 and connections between a pair of workloads 138 are illustrated when the pair of workloads 138 are connected. Here, if multiple services are provided between the pair of workloads 138, these may optionally be collapsed into a single line. The traffic flow graph 200 may be useful to enable a network administrator to better understand how the workloads 138 interoperate and may enable the administrator to create an improved segmentation policy or an improved strategy for automatically generated the segmentation policy. Furthermore, the segmentation server 120 can update the segmentation policy, either manually or by applying programmable updating rules, based on the observed communications (e.g., to permit only communications that observed under normal operation so as to prevent anomalous communications that may be malicious).

An administrator may furthermore interact with the traffic flow graph 200 to refine the visual presentation according to specified criteria. For example, an administrator may select a line of the traffic flow graph and select to hide the line. Furthermore, the administrator may switch between different granularity levels to view the traffic flow graph 200 from different perspectives. Further still, the administrator may configure various squelching rules that cause the segmentation server 120 to apply squelching filters to the traffic flow data before generating the visualization of the traffic flow graph to enable the administrator to hide traffic flow data meeting certain specified criteria and obtain a more refined view of the traffic flows.

The squelching rules may be customizable and may be written as label-based rules similarly to the segmentation policy rules described above. For example, a rule may specify that the segmentation server 120 should squelch traffic between a first group of workloads 138 (identified in the rule by a first label set) and a second group of workloads 138 (identified in the rule by a second label set) if the traffic meets specified criteria of the squelching rule. If it is desired for the squelching rule to apply universally, the label sets in the squelching rule may be set to be inclusive of all workloads 138. These label-based squelching rules beneficially enable the traffic flow graph to be efficiently customized in an environment in which individual workloads 138 may come online or offline frequently or when workloads 138 are re-assigned to different tasks and their labels may change.

In an example, an administrator may wish to hide from the traffic flow graph 200, traffic related to infrastructure or core services (e.g., DNS, NTP, Monitoring, Qualys scans, etc.) between certain groups of workloads 138. The administrator may configure a squelching rule to identify and squelch traffic meeting these criteria before generating the traffic flow graph 200. Thus, if a connection between a pair of nodes T includes only traffic related to infrastructure or core services specified in the squelching rule, the edge E between the nodes T will be hidden in the traffic flow graph 200 (although the edge E may remain if other types of traffic not meeting a squelching rule is also present between the nodes T). The squelching rule may furthermore more granularly define which types of core services traffic to squelch, by limiting the squelching rule based on characteristics such as whether the traffic corresponds to an inbound or outbound core service, whether the traffic corresponds to process-based or port-based core services, or other criteria. In another example, an administrator may wish to hide from the traffic flow graph 200, traffic related to application functionality for a specified application (e.g., Apache, MySQL, etc.). Here, a squelching rule may be applied to squelch traffic between workloads 138 related to the specified application. In another example, an administrator may wish to hide from the traffic flow graph, certain unwanted traffic data such as port scans or other traffic data that is not directly related to application functionality. In this case, the squelching rule may squelch traffic based on specified ports, protocols, and/or other identifiable criteria and lines E will be hidden from the traffic flow graph 200 if there is no other unsquelched traffic between the nodes T. In yet another example, prior to enabling enforcement of an updated segmentation policy, an administrator may want to temporarily or permanently hide traffic that will permitted by a rule of the updated segmentation policy, thus enabling the administrator to view only the lines representing blocked connections B under the current segmentation policy. This enables the administrator to easily focus on the blocked connections B to determine whether or not they should be permitted under the updated segmentation policy. Here, the administrator may also individually or in groups select to hide lines representing the blocked connections B once the administrator has determined not to include a rule enabling those connections in the updated segmentation policy. In yet another example, the administrator may wish to hide from the traffic flow graph 200, traffic that is older than a specified threshold time, and may configure a rule to squelch traffic having a timestamp before the threshold time from the traffic flow graph. Thus, connections E that have no recent traffic flow will be hidden from the traffic flow graph.

In an embodiment, squelching rules may be user-based, such that different squelching filters may be applied to the traffic flow graph 200 dependent on the identity of the administrator viewing the traffic flow graph 200. For example, when accessed by an administrator assigned to administer a particular application, the segmentation server 120 may apply squelching rules that filter out traffic flow data unrelated to the application. In an embodiment, different administrators may be assigned a role, and a squelching rule may be associated with the role so that is applied only when an administrator with that role is viewing the traffic flow graph.

Figure 3:
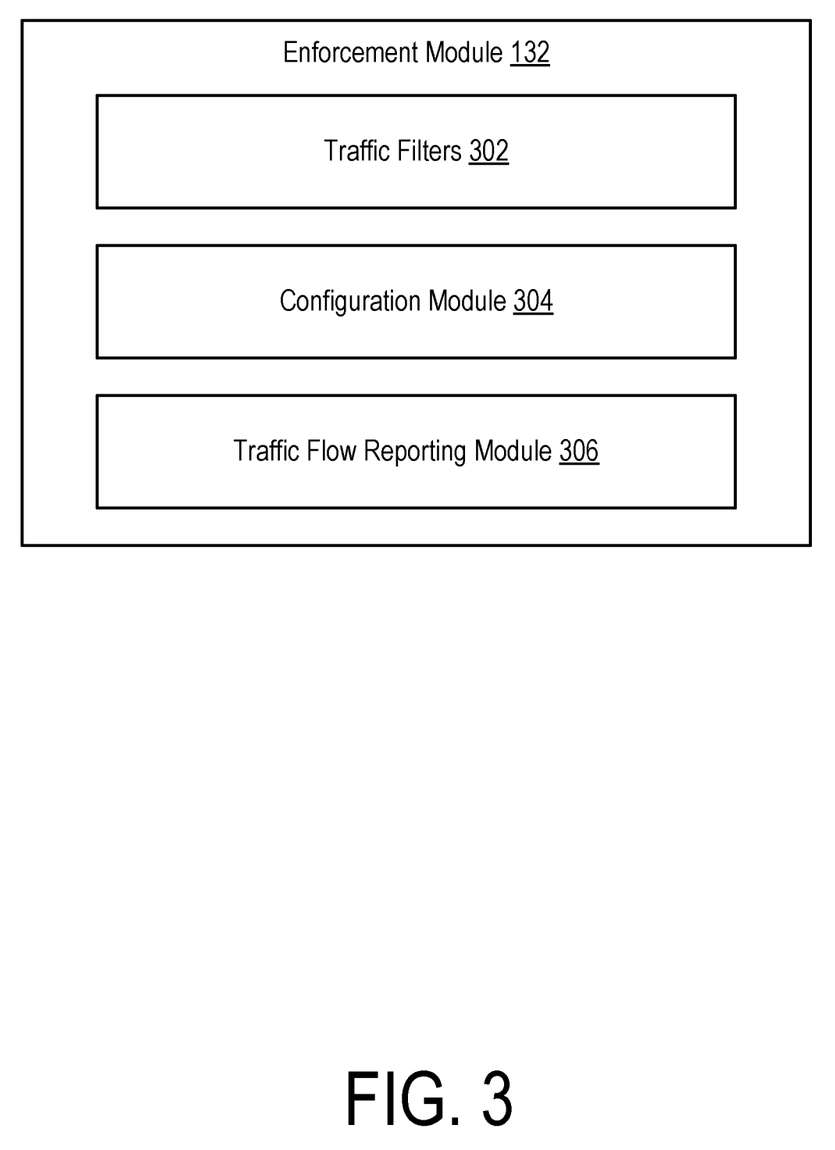
FIG. 3 is a block diagram illustrating an example embodiment of an enforcement module.

FIG. 3 illustrates an example embodiment of an enforcement module 132. The enforcement module 132 comprises traffic filters 302, a configuration module 304, and a traffic flow reporting module 306. In alternative embodiments, the enforcement module may include different or additional modules. The various components of the enforcement module 132 may be implemented as one or more processors and a non-transitory computer-readable storage medium that stores instructions executed by the one or more processors to carry out the functions attributed to the enforcement module 132 described herein.

The traffic filters 302 operates to enforce the segmentation policy with respect to a workload 138 executing on a host 130. In an embodiment, the traffic filters 302 apply a set of packet filtering rules that block or allow connections to a particular destination address based on the source address and specific criteria associated with the communications such as the ports and protocols associated with the communications and a connection state. In an embodiment, the rules applied by the traffic filters 302 are generally permissive rules (e.g., a white list) that specify which specific communications are permitted. A default rule may cause the traffic filters 302 to block communications (e.g., drop packets) that do not match any of the permissive rules. The traffic filters 302 may furthermore monitor and log the results of applying the filtering rules to communications it receives. For example, the traffic filters 302 may log each time the traffic filters 302 allow a connection and each time the traffic filters 302 block a connection attempt.

In an embodiment, the traffic filters 302 may comprise an operating system-level firewall such as a Linux kernel firewall based on iptables or Netfilter modules or a Windows firewall based on a Windows Filtering Platform. Furthermore, the traffic filters 302 may comprise an Internet Protocol security (IPsec) engine that controls encryption and decryption of packets. Additionally, the traffic filters 302 may filter traffic based on other criteria such as traffic transmission type (e.g., broadcast or multicast traffic).

The configuration module 304 receives management instructions from the segmentation server 120 and translates the management instructions from a high level of abstraction to a low level of abstraction to configure the traffic filters 302. For example, for a given rule that permits communication between a workload 138 and a group of other workloads 138 having a specified label set, the traffic filter configuration module 304 determines workload identifiers for each of the workloads 138 having the specified label set, and configures the traffic filters 302 to permit communications with the identified workloads 138 in accordance with any restrictions (e.g., ports and protocols) specified in the given rule.

The traffic reporting module 306 obtains traffic information from the traffic filters 302 (e.g., by accessing the traffic flow logs) and reports traffic flow data to the segmentation server 120.

Figure 4:
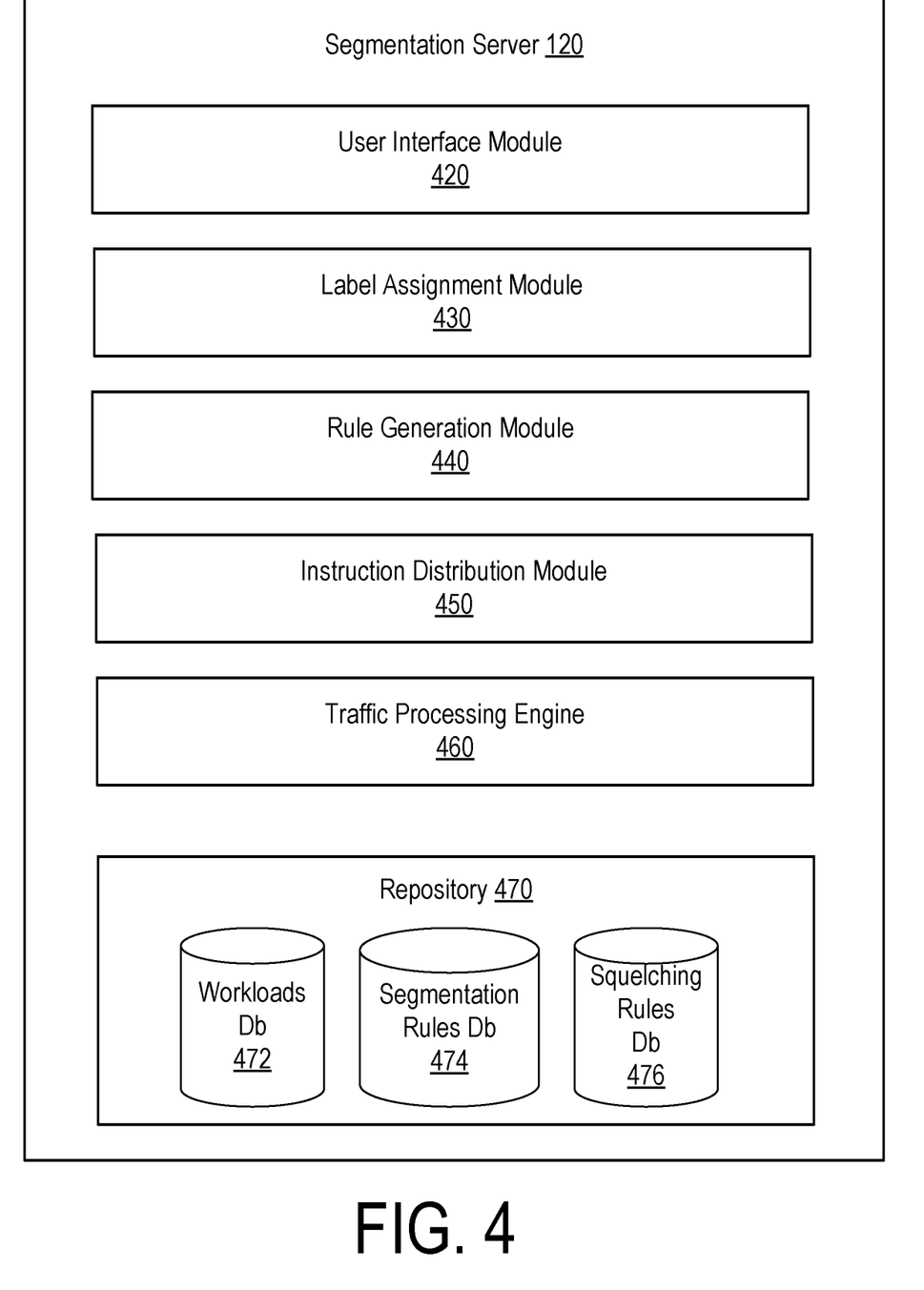
FIG. 4 is a block diagram illustrating an example embodiment of a segmentation server.

FIG. 4 is a high-level block diagram of an embodiment of a segmentation server 120. The segmentation server 120 comprises a user interface module 420, a label assignment module 430, a rule generation module 440, an instruction distribution module 450, a traffic processing engine 460, and a repository 470. The repository 470 may comprise a workloads database 472 that stores associations between workloads 138 and their respective label sets, a segmentation rules database 474 that stores a segmentation policy as a set of rules, and a squelching rules database 476 that stores squelching rules. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The user interface module 420 interfaces with the administrative client 160 to present a user interface enabling an administrator to view and interact with a representation of the traffic flows (e.g., a traffic flow graph 200). For example, the user interface module 420 may obtain requests from an administrative client 160 for a traffic flow graph 200 or for traffic flow data relating to a particular node T or edge E, B and provide the relevant information to the administrative client 160. Additionally, the user interface module 420 may interact with the administrative client 160 to present an interface to enable the administrator to customize or view information about the segmentation policy. For example, the user interface module 420 may present rules associated with a current segmentation policy and enable the administrator to add, remove, or update rules via the administrative client 160.

The label assignment module 430 facilitates assignment of labels to workloads 138. For example, the label assignment module 430 may automatically assign labels based on a set of configurable label assignment rules that may be managed by an administrator via the administrative client 160. Alternatively, labels for individual workloads 138 or groups of workloads 138 may be manually assigned by an administrator. Labels may be updated dynamically based on changing characteristics of workloads 138.

The rule generation module 440 automatically generates or updates a segmentation policy comprising a set of rules. The rules may be manually configured by a system administrator or may be generated automatically based on various predefined segmentation strategies. For example, under one segmentation strategy for automatically generating rules, the rule generation module 440 may initially configure enforcement modules 132 to permit all traffic. The rule generation module 440 then obtains traffic flow data to learn the traffic flow patterns under normal operating conditions, and generates rules to permit the traffic flows being observed under the normal operating conditions without permitting traffic flows that are not observed under these conditions. This enables programmatic generation of a segmentation policy that will block abnormal connection attempts and reduce the likelihood of malicious activity. In other embodiments, different segmentation strategies may be applied to generate segmentation rules.

The instruction distribution module 450 distributes instructions to the enforcement modules 132 to enable the enforcement modules 132 to enforce the segmentation rules. In an embodiment, the instruction distribution module 450 determines which rules are relevant to different enforcement modules 132 depending on the labels of the workloads 138 associated with each enforcement module 132 and distributes only relevant rules to each enforcement module 132. Thus, different enforcement modules 132 may receive different subsets of the rules depending on which workloads 138 are associated with them.

The traffic processing engine 460 processes the traffic flow data received from the traffic flow reporting modules 206 of the enforcement modules 132 and applies the squelching rules in the squelching rules database 476 to generate filtered traffic flow data that may be used by the user interface module 420 to generate the traffic flow graph.

Figure 5:
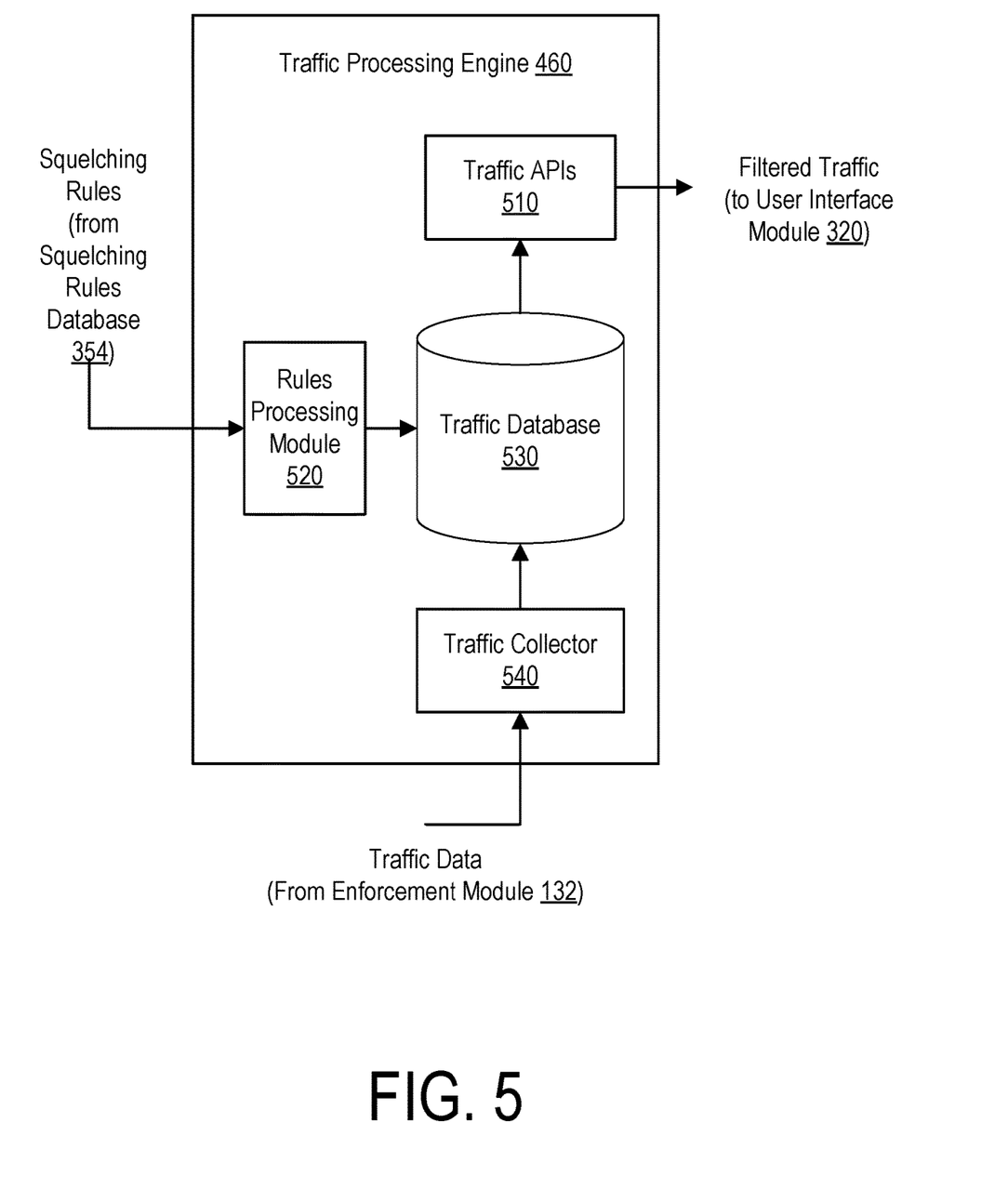
FIG. 5 is a block diagram illustrating an example embodiment of a traffic processing engine.

FIG. 5 illustrates an example embodiment of a traffic processing engine 460. The traffic processing engine 460 comprises a traffic API 510, a rules processing module 520, a traffic database 530, and a traffic collector 540. In alternative embodiments, the traffic processing engine 360 may include different or additional components.

The traffic collector 540 collects traffic data from the enforcement modules 132 and stores the collected traffic to a traffic database 530. The traffic data may include pairs of workload identifiers representing workloads 132 for which a connection was observed and pairs of workload identifiers representing workloads 132 for which a connection attempt was made but was blocked by one or more of the enforcement modules 132. Optionally, the traffic collector 540 may aggregate traffic data to remove duplicative information so that instead of storing every connection or attempted connection between a pair of workloads 138 as separate traffic data, the traffic collector 540 aggregates connections or attempted connections to store as a single entry in the traffic database 530.

The rules processing module 520 obtains the squelching rules from the squelching rules database 454 and applies the squelching rules to the traffic data in the traffic database 530 to squelch traffic data meeting criteria set forth in the squelching rules. Here, squelching the traffic may comprise deleting the traffic data from the traffic database 530 or setting a flag associated with the traffic data that causes it to be hidden from the traffic flow graph discussed below. The traffic APIs 510 interfaces between the traffic database 530 and the user interface module 420 to provide filtered traffic data to the user interface module 420. In an embodiment, the traffic APIs 510 may provide the filtered traffic data to the user interface module 520 as traffic flow data is updated in the traffic database 530. Alternatively, the traffic APIs 510 may provide filtered traffic data to the user interface module 420 in response to requests from the user interface module 420 for updated data.

In an embodiment, the traffic APIs 510 may further aggregate filtered traffic data in response to requests from the user interface module 420. For example, the user interface module 420 may request traffic flow data aggregated at the application level to generate an application level traffic flow graph 200. In this case, the traffic APIs 510 may aggregate traffic flow data between pairs of workloads 138 belonging to the same application to remove duplicative information and provide the aggregated traffic flow data to the user interface module 420. Alternatively, the traffic APIs 510 may send unaggregated traffic flow data to the user interface module 420 and the traffic may be aggregated by the user interface module 420 where appropriate.

Figure 6:
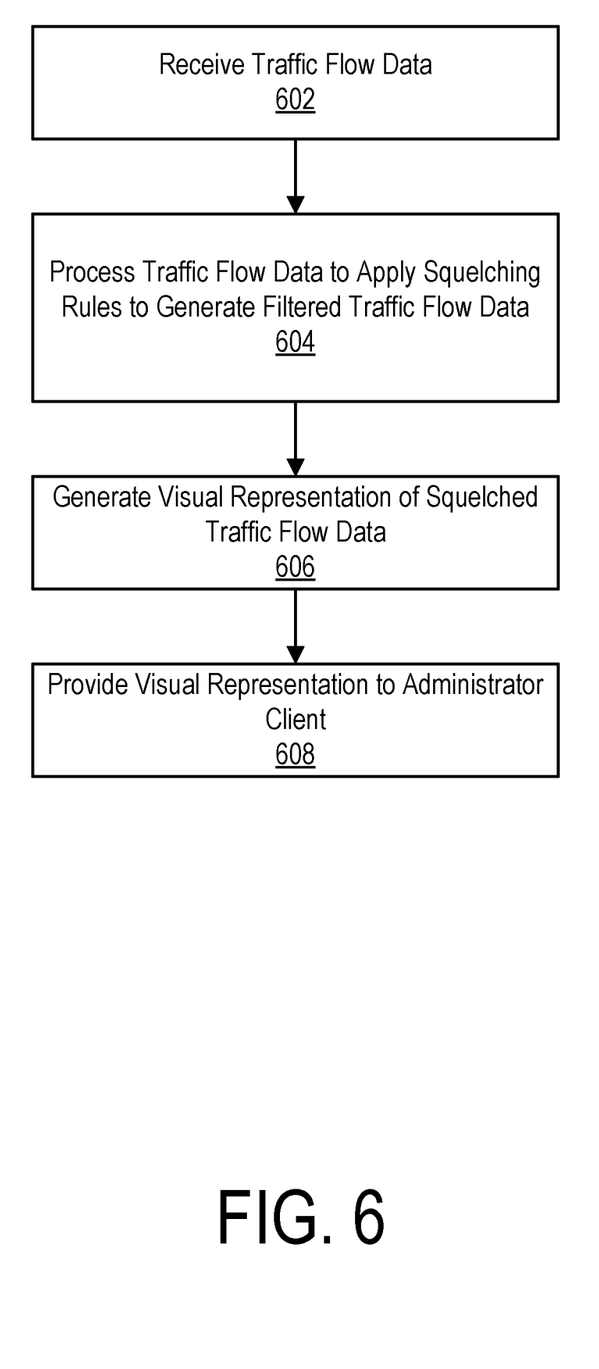
FIG. 6 is a flowchart illustrating an example embodiment of a process for squelching visible traffic in a segmented network environment.

FIG. 6 is a flowchart illustrating an example embodiment of a process for squelching visible traffic in a traffic flow graph. A segmentation server 120 receives 602 traffic flow data from enforcement modules 132. The segmentation server 120 applies processes 604 the traffic flow data to apply squelching rules and generate refined traffic flow data in which connections or connection attempts meeting specified criteria are hidden. The segmentation server 120 generates 606 a visual representation (e.g., a traffic flow graph 200) of the refined traffic flow data. The segmentation server 120 provides 608 the visual representation to the administrator client 160 to enable the administrator to view and/or interact with the traffic flow graph 200 as described above.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for generating a traffic flow graph representing traffic in a segmented network environment, the method comprising:
   enforcing a segmentation policy that controls connections between workloads based on a set of permissive label-based segmentation rules that specify a whitelist of permitted connections;
   receiving, from a plurality of distributed enforcement modules, traffic flow data representing observed active connections of workloads managed by the enforcement modules and observed blocked connections that are blocked by the enforcement modules under the segmentation policy;
   obtaining a set of squelching rules including a squelching rule specifying a first label set identifying a first group of workloads and a second label set representing a second group of workloads associated with the squelching rule;
   identifying, based on the squelching rule, observed active connections and blocked connections for squelching that each involve traffic between a workload from the first group of workloads and a workload from the second group of workloads;
   generating the traffic flow graph as a visual representation of observed active connections and blocked connections that do not meet any of the set of squelching rules, wherein the observed active connections and blocked connections for squelching identified based on the squelching rule are hidden from the visual representation, and wherein generating the traffic flow graph includes:
      generating a plurality of nodes corresponding to groups of workloads; and
      generating a plurality of blocked connection lines connecting pairs of the nodes having the blocked connections that have not been hidden based on the squelching rules;
   providing the traffic flow graph to an administrator client for display via a user interface;
   receiving a selection via the user interface of at least one of the blocked connections for hiding; and
   updating the set of squelching rules to include the selection of the at least one of the blocked connections.

2. The method of claim 1, further comprising:
   updating the set of permissive label-based segmentation rules;
   for a given segmentation rule, identifying one or more workloads affected by the given segmentation rule; and
   distributing respective instructions to one or more enforcement modules managing the one or more identified workloads to enable the one or more enforcement modules to enforce the given segmentation rule.

3. The method of claim 1, wherein generating the traffic flow graph further comprises:
   generating a plurality of active connection lines connecting pairs of the nodes having the observed active connections that have not been hidden based on the squelching rule.

4. The method of claim 1, wherein the squelching rule specifies a type of traffic, and wherein identifying the observed active connections and blocked connections for squelching further comprises:
   identifying the observed active connections and blocked connections for squelching as corresponding to the specified type of traffic.

5. The method of claim 1, wherein obtaining the set of squelching rules comprises:
   identifying an administrator logged into a segmentation server; and
   identifying the set of squelching rules as being associated with the administrator.

6. The method of claim 1, wherein generating the traffic flow graph further comprises aggregating the traffic flow data to remove duplicative traffic information.

7. A non-transitory computer-readable storage medium storing instructions for generating a traffic flow graph representing traffic in a segmented network environment, the instructions when executed by one or more processors causing the one or more processors to perform steps including:
- enforcing a segmentation policy that controls connections between workloads based on a set of permissive label-based segmentation rules that specify a whitelist of permitted connections;
- receiving, from a plurality of distributed enforcement modules, traffic flow data representing observed active connections of workloads managed by the enforcement modules and observed blocked connections that are blocked by the enforcement modules under the segmentation policy;
- obtaining a set of squelching rules including a squelching rule specifying a first label set identifying a first group of workloads and a second label set representing a second group of workloads associated with the squelching rule;
- identifying, based on the squelching rule, observed active connections and blocked connections for squelching that each involve traffic between a workload from the first group of workloads and a workload from the second group of workloads;
- generating the traffic flow graph as a visual representation of observed active connections and blocked connections that do not meet any of the set of squelching rules, wherein the observed active connections and blocked connections for squelching identified based on the squelching rule are hidden from the visual representation, and wherein generating the traffic flow graph includes:
  - generating a plurality of nodes corresponding to groups of workloads; and
  - generating a plurality of blocked connection lines connecting pairs of the nodes having the blocked connections that have not been hidden based on the squelching rules;
- providing the traffic flow graph to an administrator client for display via a user interface;
- receiving a selection via the user interface of at least one of the blocked connections for hiding; and
- updating the set of squelching rules to include the selection of the at least one of the blocked connections.

8. The non-transitory computer-readable storage medium of claim 7, wherein the instructions when executed further cause the one or more processors to perform steps including:
- updating the set of permissive label-based segmentation rules;
- for a given segmentation rule, identifying one or more workloads affected by the given segmentation rule; and
- distributing respective instructions to one or more enforcement modules managing the one or more identified workloads to enable the one or more enforcement modules to enforce the given segmentation rule.

9. The non-transitory computer-readable storage medium of claim 7, wherein generating the traffic flow graph further comprises:
- generating a plurality of active connection lines connecting pairs of the nodes having the observed active connections that have not been hidden based on the squelching rule.

10. The non-transitory computer-readable storage medium of claim 7, wherein the squelching rule specifies a type of traffic, and wherein identifying the observed active connections and blocked connections for squelching further comprises:
- identifying the observed active connections and blocked connections for squelching as corresponding to the specified type of traffic.

11. The non-transitory computer-readable storage medium of claim 7, wherein obtaining the set of squelching rules comprises:
- identifying an administrator logged into a segmentation server; and
- identifying the set of squelching rules as being associated with the administrator.

12. The non-transitory computer-readable storage medium of claim 7, wherein generating the traffic flow graph further comprises aggregating the traffic flow data to remove duplicative traffic information.

13. A computer system for generating a traffic flow graph representing traffic in a segmented network environment, the computer system comprising:
- one or more processors; and
- a non-transitory computer-readable storage medium storing instructions that when executed by the one or more processors causes the one or more processors to perform steps including:
  - enforcing a segmentation policy that controls connections between workloads based on a set of permissive label-based segmentation rules that specify a whitelist of permitted connections;
  - receiving, from a plurality of distributed enforcement modules, traffic flow data representing observed active connections of workloads managed by the enforcement modules and observed blocked connections that are blocked by the enforcement modules under the segmentation policy;
  - obtaining a set of squelching rules including a squelching rule specifying a first label set identifying a first group of workloads and a second label set representing a second group of workloads associated with the squelching rule;
  - identifying, based on the squelching rule, observed active connections and blocked connections for squelching that each involve traffic between a workload from the first group of workloads and a workload from the second group of workloads;
  - generating the traffic flow graph as a visual representation of observed active connections and blocked connections that do not meet any of the set of squelching rules, wherein the observed active connections and blocked connections for squelching identified based on the squelching rule are hidden from the visual representation, and wherein generating the traffic flow graph includes:
  - generating a plurality of nodes corresponding to groups of workloads; and
  - generating a plurality of blocked connection lines connecting pairs of the nodes having the blocked connections that have not been hidden based on the squelching rules;
  - providing the traffic flow graph to an administrator client for display via a user interface;
  - receiving a selection via the user interface of at least one of the blocked connections for hiding; and
  - updating the set of squelching rules to include the selection of the at least one of the blocked connections.

14. The computer system of claim 13, wherein the squelching rule specifies a type of traffic, and wherein identifying the observed active connections and blocked connections for squelching further comprises:

identifying the observed active connections and blocked connections for squelching as corresponding to the specified type of traffic.

15. The computer system of claim 13, wherein obtaining the set of squelching rules comprises:

identifying an administrator logged into a segmentation server; and identifying the set of squelching rules as being associated with the administrator.

* * * * *